(12) United States Patent
Kim et al.

(10) Patent No.: US 12,547,866 B2
(45) Date of Patent: Feb. 10, 2026

(54) METHOD FOR OBTAINING LOT VARIATION INFORMATION OF A DIAGNOSTIC CARTRIDGE AND AN IN VITRO DIAGNOSTIC DEVICE USING THE SAME METHOD

(71) Applicant: BODITECH MED INC., Gangwon-do (KR)

(72) Inventors: Byeong Chul Kim, Gangwon-do (KR); Young Duk Kim, Gangwon-do (KR); Hyok Jin Won Yun, Gangwon-do (KR)

(73) Assignee: BODITECH MED INC., Gangwon-do (KR)

( * ) Notice: Subject to any disclaimer, the term of this patent is extended or adjusted under 35 U.S.C. 154(b) by 0 days.

(21) Appl. No.: 18/905,466

(22) Filed: Oct. 3, 2024

(65) Prior Publication Data

US 2025/0131224 A1 Apr. 24, 2025

(30) Foreign Application Priority Data

Oct. 20, 2023 (KR) .................. 10-2023-0140871

(51) Int. Cl.
*G06K 19/06* (2006.01)
(52) U.S. Cl.
CPC .............. *G06K 19/06037* (2013.01)

(58) Field of Classification Search
CPC ............ G06K 19/06037; G06K 19/00; G06K 19/06046; G06K 7/1417
USPC ................ 235/494, 462.1, 462.09, 487, 375
See application file for complete search history.

(56) References Cited

U.S. PATENT DOCUMENTS

| | | | | |
|---|---|---|---|---|
| 2003/0004751 | A1* | 1/2003 | Ng | G16H 15/00 705/2 |
| 2019/0271681 | A1* | 9/2019 | McKirdy | G06K 19/0723 |
| 2023/0207119 | A1* | 6/2023 | Ferro, Jr. | G16H 50/20 705/2 |
| 2023/0260636 | A1* | 8/2023 | Hansen | G06K 7/10396 235/385 |

FOREIGN PATENT DOCUMENTS

| | | | | |
|---|---|---|---|---|
| CN | 110447036 A | * | 11/2019 | ....... G06K 19/06037 |
| CN | 116490931 A | * | 7/2023 | ........... G06K 7/1417 |

* cited by examiner

*Primary Examiner* — Edwyn Labaze
(74) *Attorney, Agent, or Firm* — Klintworth & Rozenblat LLP

(57) ABSTRACT

The present invention relates to a method for obtaining lot variation information of a diagnostic cartridge, and to an in vitro diagnostic device using the same method. The method of the present invention includes obtaining item information and lot information of the diagnostic cartridge; generating a QR code having an internet address for obtaining lot variation information using the obtained item information and lot information; and displaying the QR code on the display.

4 Claims, 2 Drawing Sheets

METHOD FOR OBTAINING LOT VARIATION INFORMATION OF A DIAGNOSTIC CARTRIDGE AND AN IN VITRO DIAGNOSTIC DEVICE USING THE SAME METHOD

FIELD OF THE INVENTION

The present invention relates to a method for obtaining lot variation information of a diagnostic cartridge, and more particularly to a method for more conveniently and accurately inputting lot variation information into an in vitro diagnostic device and to an in vitro diagnostic device using the same method.

BACKGROUND ART

An in vitro diagnostic (IVD) device is used to diagnose various types of specimens such as serum and urine. The reagents required for the IVD device may differ between lots due to various factors during the manufacturing process. Therefore, manufacturers evaluate the performance and characteristics of their products for each lot and provide lot variation information for that lot.

The method of inputting lot variation information into the IVD device is as follows. First, there is a method of manually inputting lot variation information. The user can enter the lot variation information through buttons or menus displayed on the screen of the IVD device. The method is simple, but its accuracy is mainly limited by human error. In addition, it can take a lot of time and is not efficient when processing a large amount of lot variation information.

Next, there is a method of inputting lot variation information by scanning a barcode or QR code. A manufacturer assigns a barcode containing lot variation information for each lot, and a user may scan this barcode to input lot variation information. This method is more accurate than the manual input method and is faster and more convenient. However, this method is very inconvenient for manufacturers because a barcode must be printed for each lot and each device and the barcode must be provided to users.

In addition, there is a method using a chip that contains memory. Using a memory chip, by directly inserting a chip that stores lot variation information into an IVD device, the IVD device can read the information in the chip and quickly obtain lot variation information. This method has the great advantage of excellent accuracy and stability in data transfer due to direct physical connection. Also, this method has an advantage in terms of security as it can greatly reduce the risk of hacking or data theft from the outside. Furthermore, this method has an advantage of being able to quickly transmit a large amount of data depending on the capacity of the memory chip. However, the process of manufacturing and distributing memory chips for each lot requires additional cost and time. Physical chips are at risk of being damaged or contaminated. Also, the cost burden of manufacturing and distributing a large number of memory chips increases.

Also, there is a method using RFID chips. A manufacturer attaches an RFID chip to a diagnostic cartridge or the like for each lot, and a user can input the lot variation information using an RFID reader mounted on the IVD device. This method is more accurate and faster than scanning a barcode. However, this method is difficult to input if the RFID chip is damaged.

Similar to the method of using RFID chips, there is also a method that utilizes near-field communication (NFC) technology. NFC is similar in principle to RFID, but is characterized by shorter communication distance. A manufacturer stores lot information in NFC tags, and a user can obtain the information using the built-in NFC reader of the IVD device. NFC can transmit information faster than RFID due to its short communication range. Both methods are limited in the amount of data they can store, so they may not be suitable for storing complex or large data sets. In addition, since a reader is required inside the IVD device, there is a problem that the manufacturing cost of the device increases.

Furthermore, there is a method of inputting lot variation information using the Internet. A manufacturer assigns a unique Internet address to each lot, and a user can input this address into an in vitro diagnostic device to obtain the lot variation information. This method is more accurate than the manual input method. However, this method requires an Internet connection, so it is difficult to input data when the Internet environment is unstable. Also, there is the disadvantage that security issues may arise.

DETAILED DESCRIPTION OF THE INVENTION

Technical Problem

Accordingly, the objective of the present invention is to more conveniently and accurately input lot variation information of a diagnostic cartridge into an in vitro diagnostic device.

Technical Solution

One aspect of the present invention to achieve the foregoing objective is a method for obtaining lot variation information of a diagnostic cartridge in an in vitro diagnostics device including a display and a storage, the method comprising: obtaining item information and lot information of the diagnostic cartridge; generating a QR code including an internet address for obtaining lot variation information using the obtained item information and lot information; and displaying the QR code on the display.

Preferably, the obtaining of item information and lot information is performed by scanning a barcode printed on the diagnostic cartridge inserted into the in vitro diagnostic device.

Preferably, the method further comprises checking whether lot variation information corresponding to the obtained item information and lot information exists in the storage. Also, the method further comprises notifying a user to input lot variation information if the lot variation information does not exist in the storage.

Another aspect of the present invention is an In vitro diagnostics device, the device comprising: a first scanner for scanning a diagnostic cartridge to obtain item information and lot information; a control unit that generates a QR code including an Internet address for obtaining lot variation information using the obtained item information and lot information; a display for displaying the QR code including the Internet address; and a storage for storing item information, lot information, and lot variation information of the diagnostic cartridge.

Preferably, the first scanner scans a barcode printed on the diagnostic cartridge inserted into the in vitro diagnostic device. Also, if lot variation information corresponding to the item information and lot information obtained by the scanner does not exist in the storage, the control unit notifies the user to input the corresponding lot variation information.

TECHNICAL EFFECTS

According to the present invention, lot variation information can be inputted into an in vitro diagnostic device quickly and accurately. Also, since the in vitro diagnostic device does not need to be connected to any network, the present invention can be easily used even in cases where the network environment is poor or security is required. In addition, there is no need to manufacture or distribute separate lot variation information cards or chips. The necessary information is acquired from a server in real time, so the latest information is always utilized. Therefore, even if the lot variation information changes, it only needs to reflect the updated information on the server without the need for the device user or manufacturer to take any separate action. This increases the efficiency of maintenance in manufacturing.

BEST MODE FOR ACCOMPLISHING THE INVENTION

Figure 1:
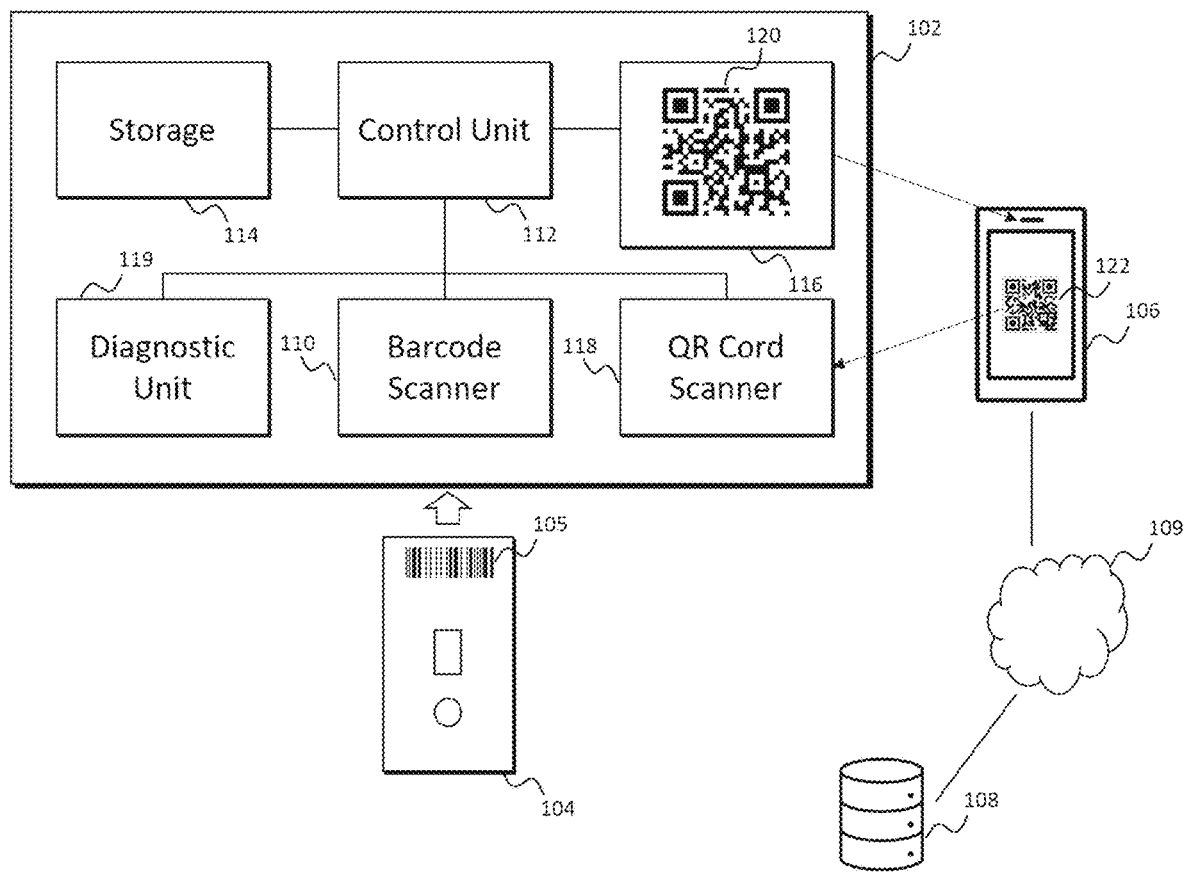
FIG. 1 is a diagram illustrating the configuration and network connection of an in vitro diagnostic device according to an embodiment of the present invention.

Hereinafter, embodiments of the present invention will be described in detail with reference to the accompanying drawings. Terms used in this description should not be construed as being limited to conventional or dictionary meanings. Therefore, the embodiments described in this specification and the configurations shown in the drawings are only one of the most preferred embodiments of the present invention and do not represent all of the technical ideas of the present invention, so that it should be understood that there may be various equivalents and modifications that can replace them at the time of this application. In the entire drawing, those having the same function are given the same reference numerals, and detailed description thereof will be omitted.

FIG. 1 is a diagram illustrating the configuration and network connection of an in vitro diagnostic device 102 according to an embodiment of the present invention. As shown, the in vitro diagnostic (IVD) device 102 comprises a barcode scanner 110, a control unit 112, a storage 114, a display 116, a QR code scanner 118, and a diagnostic unit 119.

When it is confirmed that the diagnostic cartridge 104 is inserted into the IVD device 102, the control unit 112 may obtain item information and lot information of the diagnostic cartridge 104 by driving the barcode scanner 110 to scan the barcode 105 printed on the diagnostic cartridge 104 inserted into the IVD device 102. Alternatively, when a user presses the control button displayed on the display 116, the control unit 112 may obtain item information and lot information of the diagnostic cartridge 104 by driving the barcode scanner 110 to scan the barcode 105 printed on the diagnostic cartridge 104 inserted into the IVD device 102.

The storage 114 stores item information, lot information, and lot variation information of the diagnostic cartridge 104.

The control unit 112 checks whether the storage 114 has the item information acquired by the barcode scanner 110 and the lot variation information corresponding to the lot information. When it is confirmed that the storage 114 already has lot variation information, the control unit 112 notifies the user of this fact through the display 116.

If the storage 114 does not have lot variation information for the diagnostic cartridge 104, the control unit 112 generates a first QR code 120 including an Internet address of a site where lot variation information can be obtained using the item information and lot information obtained from the barcode scanner 110, and displays the first QR code 120 on the display 116.

By scanning the first QR code 120 using the smartphone 106, the user connects over the network 109 to a service server 108, which provides lot variation information for the diagnostic cartridge 104.

The service server 108 causes a second QR code 122 including lot variation information to be exposed to the user's smartphone 106.

When the second QR code 122 is scanned by the QR code scanner 118, the control unit 112 extracts lot variation information from the second QR code 122 and stores the extracted lot variation information in the storage 114. Next, when the user presses the control button displayed on the display 116 or automatically, the control unit 112 analyzes the diagnosis cartridge 104 through the diagnosis unit 119.

Figure 2:
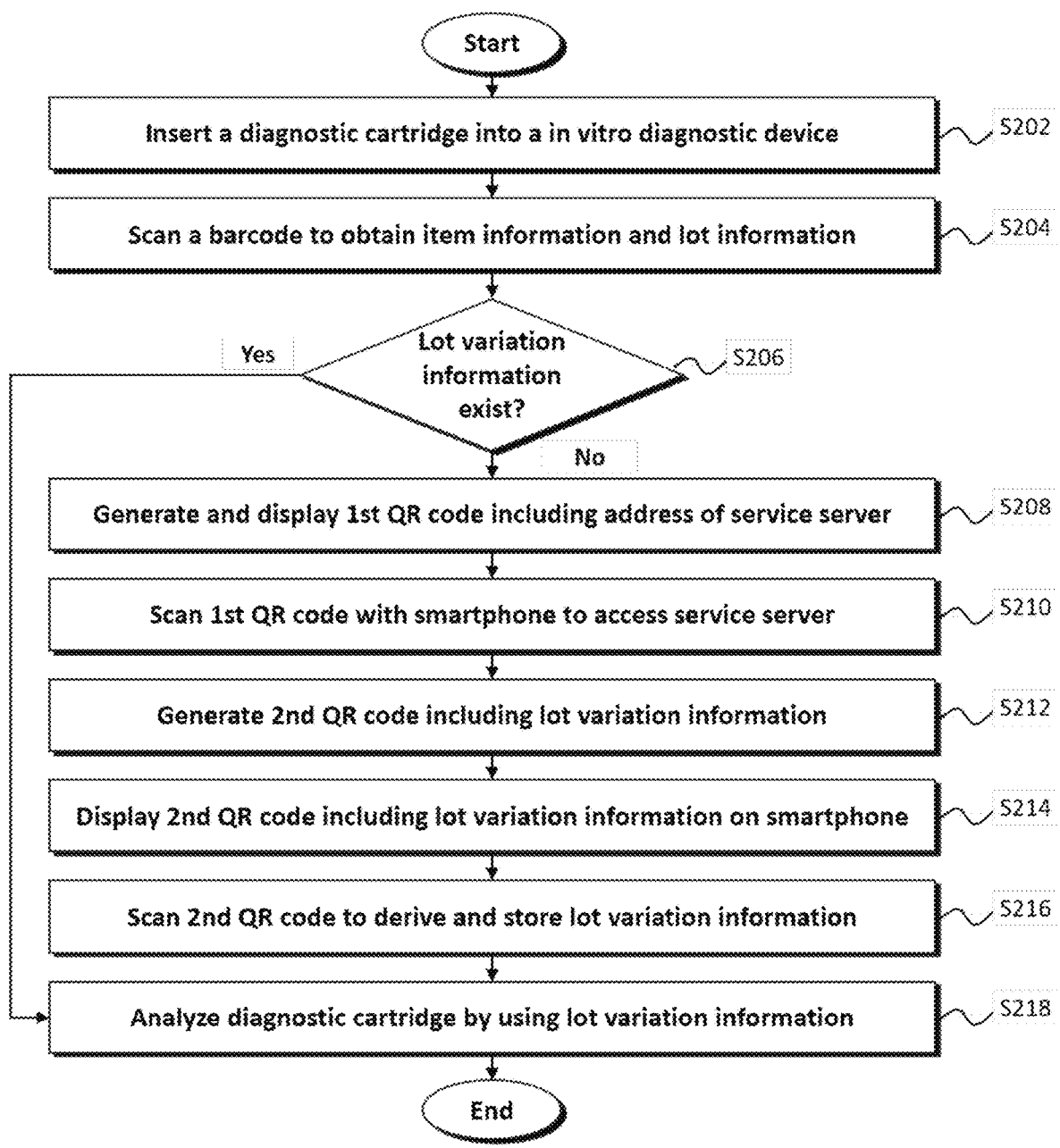
FIG. 2 is a flow chart illustrating a method for obtaining lot variation information of a diagnostic cartridge in the in vitro diagnostic device shown in FIG. 1.

FIG. 2 is a flowchart illustrating a method of obtaining lot variation information of the diagnostic cartridge 104 in the IVD device 102 shown in FIG. 1.

First, the user inserts the diagnostic cartridge 104 into the IVD device 102 (S202). The control unit 112 of the IVD device 102 causes the barcode scanner 110 to scan the barcode 105 printed on the diagnostic cartridge 104 to obtain item information and lot information corresponding to the diagnostic cartridge 104 (S204).

The control unit 112 checks whether the lot variation information corresponding to the obtained item information and lot information exists in the storage 114 (S206). If the lot variation information exists in the storage 114, an inspection of the diagnostic cartridge 104 is immediately performed using the lot variation information (S218). If the lot variation information does not exist in the storage 114, the control unit 112 generates a first QR code 120 containing an internet address to access a service server where the lot variation information can be obtained, item information, lot information, and IVD device information. The control unit 112 causes the first QR code to be displayed on the display 116, and notifies the user to input the lot variation information (S208). The control unit 112 instructs the user to scan the first QR code 120 with the smartphone 106.

The user scans the first QR code 120 using the smartphone 106 to access the service server 108 through the network 109 (S210). The service server 108 derives item information, lot information, and IVD device information from the first QR code 120, and generates a second QR code 122 including lot variation information corresponding to the derived information (S212).

The service server causes the second QR code 122 to be displayed on the user's smartphone 106 (S214). The user inputs the second QR code 122 displayed on the smartphone 106 into the IVD device 102 by scanning it through the QR code scanner 118 of the IVD device 102. The control unit 112 causes lot variation information to be derived from the input second QR code 122 and stored in the storage 114 (S216). The control unit 112 then causes an inspection for the diagnosis cartridge 104 to be performed using the lot variation information through the diagnostic unit 119 (S218). The present invention enables fast and accurate input of lot variation information into an IVD device. Furthermore, since the IVD device does not need to be connected to any network, it can be easily used even in cases where the network environment is poor or security is required. In addition, since a printed lot variation information does not need to be used, it is easy to manage during the packaging and manufacturing process. In addition, since the user obtains lot variation information and inputs it into the IVD device using a smartphone without having to set up a network connection, high mobility and convenience can be expected.

Although preferred embodiments of the present invention have been described in detail above, the scope of the present invention is not limited thereto, but various modifications and improvements made by those skilled in the art using the basic concept of the present invention as defined in the append portioned claims are also within the scope of the present invention.

The invention claimed is:

1. A method for obtaining lot variation information of a diagnostic cartridge in an in vitro diagnostics device including a display and a storage, the method comprising:
  (a) obtaining item information and lot information of the diagnostic cartridge by scanning the diagnostic cartridge;
  (b) checking whether lot variation information corresponding to the obtained item information and lot information exists in the storage;
  (c) in response to determining that the lot variation information does not exist in the storage:
    (c-1) generating a first QR code including an internet address for obtaining lot variation information using the obtained item information and lot information;
    (c-2) displaying the first QR code on the display for scanning by a mobile device
    (c-3) receiving a second QR code displayed on the mobile device, wherein the second QR code includes the lot variation information obtained from a service server through the internet address; and
    (c-4) extracting and storing the lot variation information from the second QR code in the storage for analyzing the diagnostic cartridge; and
  (d) analyzing the diagnostic cartridge using the stored lot variation information.

2. The method of claim 1, further comprising notifying a user to scan the first QR code when the lot variation information does not exist in the storage.

3. An in vitro diagnostics device, the device comprising:
  a first scanner for scanning a diagnostic cartridge to obtain item information and lot information of the diagnostic cartridge;
  a storage for storing item information, lot information, and lot variation information of the diagnostic cartridge;
  a second scanner for scanning a QR code containing lot variation information;
  a control unit configured to:
    (a) check whether lot variation information corresponding to the obtained item information and lot information exists in the storage; and
    (b) in response to determining that the lot variation information does not exist in the storage:
      (b-1) generate a first QR code including an internet address for obtaining lot variation information using the obtained item information and lot information;
      (b-2) receive, via the second scanner, a second QR code displayed on a mobile device, wherein the second QR code includes the lot variation information obtained from a service server through the internet address, and
      (b-3) extract the lot variation information from the second QR code and store the extracted lot variation information in the storage; and
  a display for displaying the QR code including the internet address,
  wherein the control unit is further configured to analyze the diagnostic cartridge using the stored lot variation information.

4. The device of claim 3, wherein the first scanner scans a barcode printed on the diagnostic cartridge inserted into the in vitro diagnostic device.

\* \* \* \* \*